US006965724B1

(12) United States Patent
Boccon-Gibod et al.

(10) Patent No.: US 6,965,724 B1
(45) Date of Patent: Nov. 15, 2005

(54) TRICK-PLAY MODES FOR PRE-ENCODED VIDEO

(75) Inventors: Gilles Boccon-Gibod, San Francisco, CA (US); David Lionel McLaren, Mountain View, CA (US)

(73) Assignee: Thomson Licensing S.A., Boulogne-Billancourt (FR)

(*) Notice: Subject to any disclaimer, the term of this patent is extended or adjusted under 35 U.S.C. 154(b) by 775 days.

(21) Appl. No.: 08/913,803

(22) PCT Filed: Mar. 8, 1996

(86) PCT No.: PCT/US96/02642

§ 371 (c)(1),
(2), (4) Date: Sep. 22, 1997

(87) PCT Pub. No.: WO96/31065

PCT Pub. Date: Oct. 3, 1996

(30) Foreign Application Priority Data

Mar. 30, 1995 (GB) .................................. 9506493

(51) Int. Cl.[7] .............................................. H04N 5/91
(52) U.S. Cl. ......................... 386/68; 386/111; 386/125
(58) Field of Search ....................... 386/68, 46, 81–83, 386/109, 111–112, 12, 6–8, 125, 124

(56) References Cited

U.S. PATENT DOCUMENTS 5,546,244 A * 8/1996 Park et al. .................. 386/124
5,923,812 A * 7/1999 Sakazaki et al. ............. 386/68
5,933,567 A * 8/1999 Lane et al. ................... 386/68
6,023,553 A * 2/2000 Boyce et al. ................ 386/112
6,064,794 A * 5/2000 McLaren et al. ............. 386/68
6,091,886 A * 7/2000 Abecassis ................... 386/83

FOREIGN PATENT DOCUMENTS

| EP | 0598516 | 5/1994 |
| EP | 0625857 | 11/1994 |
| EP | 0698999 | 2/1996 |
| WO | 95 26108 | 9/1995 |

* cited by examiner

*Primary Examiner*—James J. Groody
*Assistant Examiner*—Christopher Onuaku
(74) *Attorney, Agent, or Firm*—Joseph S. Tripoli; Harvey D. Fried; Francis A. Davenport

(57) ABSTRACT

An inventive method provides various reproduction modes by controlled selection of replay locations. Selection within a video stream or between separate video streams derived for selected trick-play speeds may be facilitated. The method allows selections to be decoded and displayed independently from a previously video stream selection. The method comprises the steps of: identifying a digitally encoded set of signals in a storage medium for each one of a plurality of video programs for reproduction of each one of said plurality of programs at a plurality of reproduction speeds; linking each of the encoded signals in each of the sets to one another at predetermined jump points; reproducing one of the encoded signals in response to selection of a program and a reproduction speed; jumping to different ones of the encoded signals for the reproducing in accordance with the predetermined jump points, in response to subsequent selections of different reproduction speeds; and, decoding the reproduced signals for display of the selected program at the selected reproduction speeds.

8 Claims, 4 Drawing Sheets

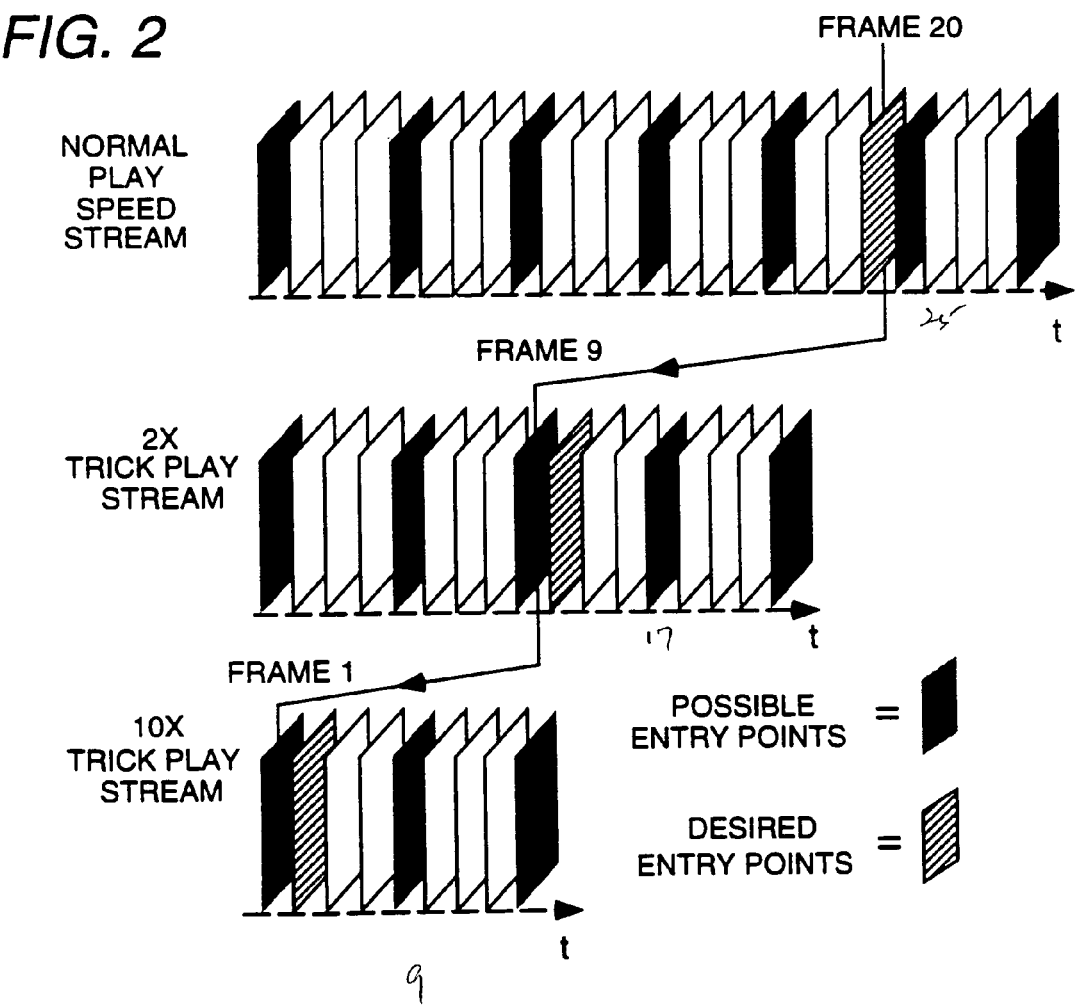

FIG. 3  LOOKUP TABLES FOR TRANSITION FROM NORMAL PLAY SPEED
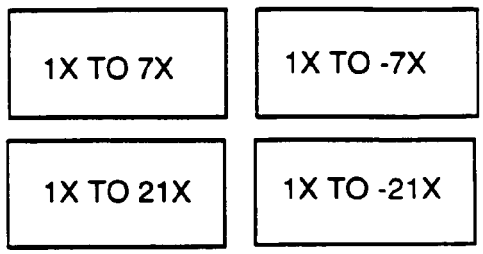
LOOKUP TABLES FOR TRANSITION FROM 7X PLAY SPEED
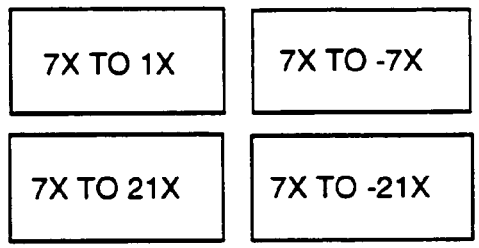

TRICK-PLAY MODES FOR PRE-ENCODED VIDEO

This invention relates to digitally compressed video material and in particular to the provision this material at speeds other than at normal play speed.

BACKGROUND OF THE INVENTION

The implementation of trick-play modes within digital video systems is a problem which is becoming more important as digital video-based systems enter the marketplace. Emerging consumer video products such as video on demand (VOD), video CDs, and other similar systems may compete with the VHS tape market as providers of feature-length movies. However, unlike analog-based replay methods, digital video systems represent a challenge in the reproduction of video images at speeds other than normal play speed. Such "off speed" reproductions being known as trick-play which may provide images at various speeds, for example, fast-forward, fast-reverse, freeze-frame etc.

In European Patent application number EP A 0625857 a video server is disclosed which provides video signals to a user responsive to control signals received therefrom. Application EP A 0625857 teaches the use of a real time signal and an exemplary 10 times speed special signal which are linked to permit selection therebetween without program discontinuity. The special signal is processed such that its transmission rate is no higher than that of the real time signal. Special signal processing is acheived by omitting inter-frame coded data from the MPEG bistream. Application EP A 0625857 recognizes the requirement to restrict the transmission rate of the trick play or special signal and as a consequence of omitting inter-frame coded data must recalculate time stamps.

SUMMARY OF THE INVENTION

The invention relates to a method for reproducing a video program with selection between normal play signal and trick-play signal having reduced resolution. The selection between modes being controlled selection of "replay" locations. The method allows successive selections to be decoded and displayed independently from any previously selected video stream.

According to the invention, a method for reproducing from a storage medium, one of a plurality of video programs at a plurality of reproducing speeds wherein selection of ones of the plurality of speeds are linked at predetermined jump points, the method comprising the steps of:
a) selecting one of the plurality of video programs for reproduction;
b) selecting a reproduction speed for the one of the plurality of video programs;
c) selecting a digitally encoded signal from a set of signals corresponding to the one of the plurality of video programs responsive to the reproduction speed;
d) reproducing the digitally encoded signal from the set of signals;
e) jumping to different ones of the encoded set of signals for the reproducing in accordance with the predetermined jump points, in response to subsequent selections of different reproduction speeds;
f) decoding the reproduced signals for display of the selected program at the selected reproduction speeds; and, wherein the step c) further comprises selecting the digitally encoded signal from the set of digitally encoded signals corresponding to different speeds of reproduction with differing resolution values.

BRIEF DESCRIPTION OF THE DRAWING

FIG. 1 shows table 1 which indicates advantageous bit rate and resolution differences for both normal and trick-play modes.

FIG. 2 illustrates compressed video data streams representing normal play speed, twice play speed and ten times play speed.

FIG. 3 illustrates table groups for use in an inventive method for selecting between bit streams representing normal and trick-play reproduction speeds.

DETAILED DESCRIPTION

Figure 4:
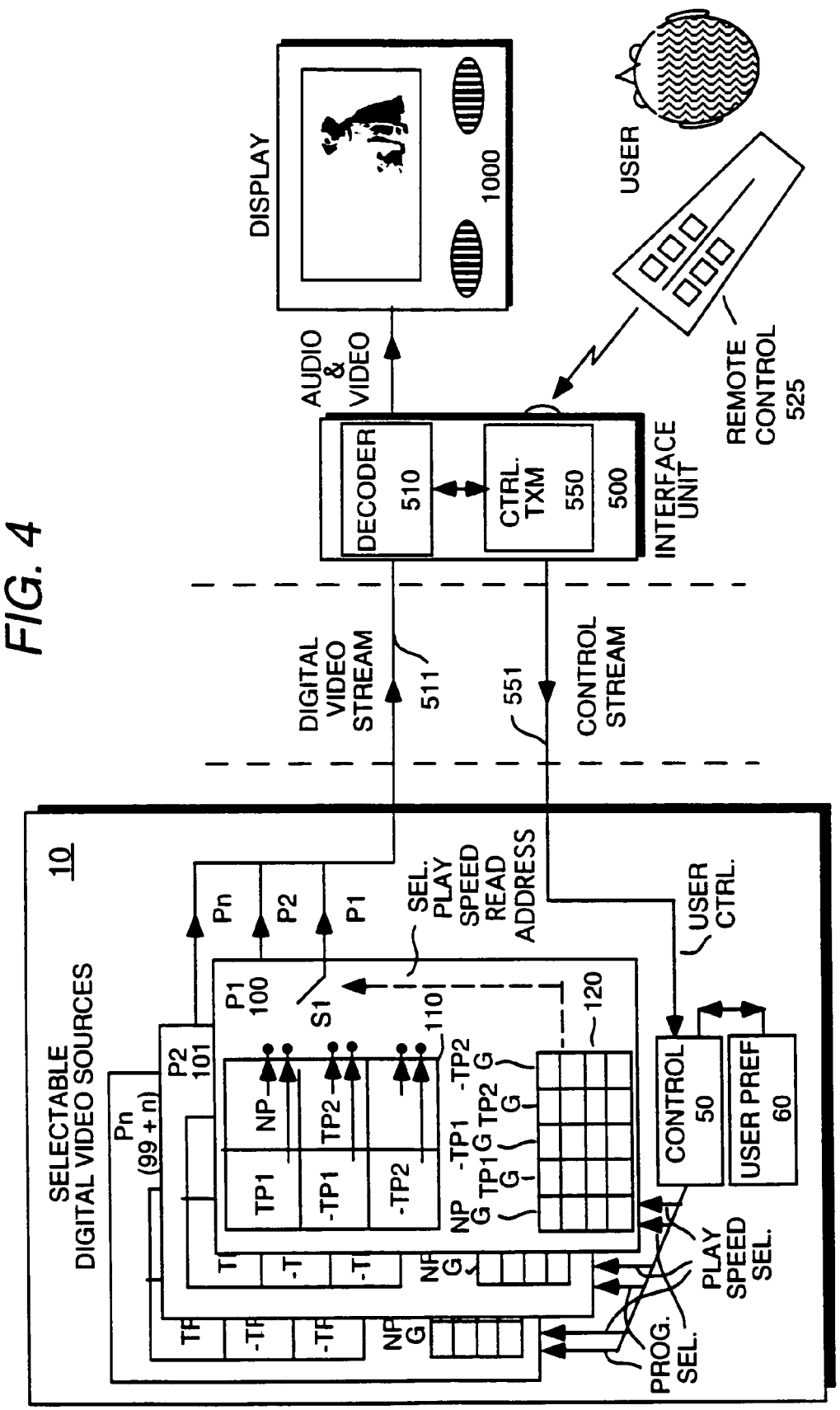
FIG. 4 is a block diagram illustrating a system employing inventive features for selection and control of compressed digital video sources.

This inventive method facilitate various trick-play modes by controlled selection of "replay" locations. Depending on the program storage medium a single stream may provide normal play speed and trick-play operation. However, the provision of both normal play speed and trick-play operation from a single program stream may result in trick-play speeds limited by the GOP size or I frame repetition rate. To provide a greater selection of trick-play speeds multiple program streams may be used with a single stream for normal play speed operation with other streams providing a variety of fast-forward and fast-reverse trick-play modes. The image streams which provide the trick-play feature may not necessarily be encoded at the same bit-rate, and may not necessarily have the same resolution as the original image stream. The use of a significantly lower bit-rate and/or resolution for encoding trick-play image streams may offer savings benefits when storage space and/or transmission costs are considered. In addition, human visual perception may also allow these trick-play image streams to be processed further to reduce resolution, and hence storage and transmission costs during trick-play video operation, without compromising perceived image quality.

As mentioned this method may be applied to various forms of video material, analog or digital and encoded in a variety of ways. However, in this description of an exemplary system, it is assumed that trick-play streams are encoded in an MPEG format with the following parameters:
there is one normal-play (normal speed) MPEG video stream,
two fast-forward streams are required, 7× & 21× normal speed,
two fast-reverse streams are required, minus 7× & 21× normal speed.

However, this method may be applied equally effectively to a variety of other speed configurations.

In the exemplary system, five separate MPEG-encoded streams are required. These streams are completely independent and may be of varying bit-rates and/or varying display resolutions. For example, one possible trade-off between quality and memory efficiency is illustrated in table 1 shown in FIG. 1. Table 1 shows trick-play streams employing lower resolution, 352×240 pixels and a lower bit-rate, 1.5 Mbps than the normal-play stream, 704×480 at 4.0 Mbps. This trade-off is fully acceptable since high spatial picture quality may result in trick-play resolution beyond human visual perception. Hence the trade-off in resolution and bit rate results in more efficient storage utilization. The extra memory capacity required to store all forward and reverse trick-play streams may be calculated by summing each trick-play bit-rate divided by the trick-play speed for each trick-play speed and expressing as a percentage of the normal play speed bit-rate.

$$\text{Extra storage required as percentage} = \frac{2[1.5/7] + 2[1.5/21]}{4} \times 100\%$$

extra storage required=14.37%

Thus four trick-play data streams may be accommodated with approximately 15% extra storage capacity. A reverse normal play feature may be provided, which may appear to increase trick-play storage capacity requirements by 100%. However, such a reverse normal play feature may be facilitated with, for example, bit rate and resolution reductions. Thus the reverse normal play feature may require approximately 37% extra storage capacity, which when added to the other trick-play streams represents a storage capacity increase of about 50% of the normal play stream requirement.

As video material is read or replayed from the video server to the user's decoder, the server may be switched between the various streams in response to user instructions. For example, the user may select, via a remote control command, the highest fast-forward speed to rapidly locate a particular point in the material. The fast-forward control command results in the server readout address jumping, from the current location in the normal-play stream to the corresponding appropriate point within the 21× fast-forward stream and continue playing. Each trick-play and normal-play streams should comprise relatively uniform, short group of pictures (GOP) having a size of, for example, half a second. This GOP size yields a worst case visual continuity error of 0.25 seconds, i.e. time to reach the nearest I frame entry point when switching between bit streams.

An important part of the overall system is the method for determining switching entry points between the different image streams. For example, during "playback" of one stream a user may wish to switch to another stream. This switch requires calculation of the exact location in the new stream, to a byte accurate level, that the decoder should begin to "play" from. The determination of the "entry point" in the new stream may be derived as follows:

1. Determine the current byte offset, and hence the current frame in the current file.
2. Determine the new frame to switch to in the new file.
3. Determine the byte offset in the new file.

Step 2 is complicated by the fact that, for MPEG streams, the entry points into a new stream are limited to those points where a sequence_header exists, which is typically at an I frame at the beginning of a group of pictures (GOP). It is further complicated by the fact that the duration of the real display time of a GOP is not always constant even if the number of frames in a GOP is constant. This complication arises from the possibility to repeat fields (or frames) in an MPEG sequence, with the result that more final 'displayed' frames can be produced by a single GOP than there are coded 'pictures' within the GOP.

An example of stream switching is illustrated in FIG. 2. In FIG. 2, the normal speed image stream is being read or "played" from a storage medium, and two trick-play image streams are available on the medium for reproduction at 2× and 10× normal speed. The trick-play speeds of 2 and 10 times are selected for illustration simplicity. At the instant of user trick-play selection or switching time, the normal play image stream is at frame number 20. Possible entry points into each of the three streams are determined by sequence headers which are depicted by darkened frames in FIG. 2, and typically begin a group of pictures (GOP). The "best fit" frames which can be switched to are pointed to by the arrow head line which links the entry points in the various video streams. The "ideal" or desired entry points, in terms of the users visual continuity, are indicated in FIG. 2 by horizontally shaded frames. Note that these "ideal" points are not necessarily calculated simply from (current frame in normal sequence)/(trick-play stream speed) due to the complications of displayed and repeated frames described above. In each case, the actual frame selected is a "best fit" possible entry frame which is closest in time to the users desired or "ideal" frame. From the illustration in FIG. 2, the decision of which frame to switch to may appear to be obvious. However, from an algorithmic point of view this is far from trivial. An important part of the overall system is the method of determining the switching points between the different streams. To accomplish this function, a look-up table, LUT may be employed which may be pre-recorded on the program storage medium. The functionality and arrangement of this exemplary look up table is described in Table 2 which shows the general layout.

TABLE 2

[number_of_tables]
[Table_number] {file_name} <bit_rate Mbps> [num_gops]
[num_frames] [gop_size] [1st_gop_size] [speed]
[gop number] [file byte offset]
[gop number] [file byte offset]
[gop number] [file byte offset]
.
.   Repeated [num_gops] times
.
[gop number] [file byte offset]
[gop number] [file byte offset]
[gop number] [file byte offset]
.
. Repeat all of above (except first line) [number_of_tables] times
.

TABLE 2 Parameter Definitions:
[ ] denotes an integer value,
< > denotes a floating point value,
{ } denotes a text string,
[number_of_tables]
The number of look-up tables in the file is the same as the number of bit streams. In exemplary FIG. 1 there are 5 streams thus [number_of_tables] is 5.
[Table_number]
Is a number which is associated with the ordering of the streams. This number must be between 0 and [number_of_tables] − 1. [Table_number] also shows the order of the streams from fastest reverse to fastest forward.
{file_name}
The name of the muxed MPEG stream.
<bit_rate>
The rate in Mbits/second of the muxed MPEG stream including transport layer overhead.
[num_gops]
The number of GOPs in the video stream.
[num_frames]
The total number of frames in the MPEG video stream.
[gop_size]

TABLE 2-continued

The GOP size in displayed frames taking into account 3/2 pull down if necessary.
[1st_gop_size]
The size in displayed frames of the first GOP. Usually this will be [gop_size] - M + 1. Where M is the distance between I and P frames in an MPEG stream
[speed]
Speed of the trick-play stream including sign.

The exemplary look-up-table, LUT of Table 2 may be stored in the system memory during playback of the video material. When the user changes from one speed to another, the information in the LUT is used to locate the correct, or corresponding point, in the new stream at which to start decoding. The information in the LUT is needed for this purpose together with the current offset, in bytes in the current bit-stream being played.

To initiate switching between streams the current GOP is determined from the current file offset by searching through the look-up table to find the GOP start point which corresponds to the current file offset (see Table 2). Once the current GOP is known, the new GOP, gop_new, may be calculated from the old GOP, gop_old, using equations 1 and 2, and the following parameters, speed_new, speed_old, gop_size and first_gop_size;

$$gop\_new = [(old\_frame * old\_speed/new\_speed) + (gop\_size - first\_gop\_size)]/gop\_size \quad \text{Equation 1.}$$

$$\text{where} \quad old\_frame = gop\_old * gop\_size - (gop\_size - first\_gop\_size) \quad \text{Equation 2.}$$

Having calculated the new GOP the look-up table appropriate to the new speed is searched to find the file offset which corresponds to the new GOP. The new stream may then be played starting at this new file offset point. The relative simplicity of this system results in efficient switching between different streams. However, this method is based on real time calculation of the new GOP with the assumption that the streams contain GOPs which produce a constant number of displayed frames (denoted by gop_size). If this is not true, due to either a varying GOP structure used to encode the stream, or a non-constant field repeat pattern within the source material and the use of de-telecine during encoding, then the above equations will not hold true.

In view of the possibility of these assumptions being false, i.e. it is not known in advance exactly how many frames will be produced by a GOP when decoded, it may not always be possible to accurately calculate, in real time, the point at which to enter the new bit stream given the point in the current stream unless a complete "time-map" of the new stream is available. This is because even if the current "real time" frame number is known, the calculation of which picture number in the new stream corresponds to the same point in time is not possible if equations 1 and 2 are not valid. In addition to this practical problem, it is also advantageous to have the ability fine tune the stream switching delay and accuracy independently from the actual switching software. For these reasons an advantageous look-up table method is disclosed, which lists "entry points" thus avoiding both real time calculation of the second step, and the attendant problems of repeated frames. The advantageous look-up tables are assembled "off-line" and may be stored together with the corresponding program stream. The use of preprocessed look-up tables allows the entry point determination and tuning of stream switching delays to be performed independently from the software which utilizes the tables.

The use of these generic look-up tables containing entry, or jump to points for the various play and trick-play streams requires comparatively simple software control. Hence, user controls may be advantageously provided to facilitate fine tuning or modification of the stream switching delay independently from the actual switching control software. For example, a user may, in the interest of continuity of entertainment, opt to always join the new image stream ½ or 1 second prior to the departure point in the first stream, in this way "program" image continuity may be sustained. In addition such an "off set" entry point may advantageously compensate for user reaction time.

In addition the user may be provided with the ability to determine the accuracy, resolution or granularity of the look-up tables. For example, since "jump to" address occur at each I frame clearly the highest resolution is obtained when every I frame in each stream is included in the LUT. This level of resolution maximizes the look-up table memory requirements. However, fewer I frame addresses in the LUT will reduce memory requirements but may introduce user frustration even if the jump to address is automatically corrected to include otherwise lost program images. These user control preferences may be facilitated independently from the actual switching control software. Hence the control software never requires modification even when a switching scheduling change is necessary. A conceptual illustration of 2 look up tables or LUT sets is shown in FIG. 3. FIG. 3 illustrates possible transition destinations from normal play speed and 7 times play speed. Similar sets of tables are required for transitions from 21×, -7× and -21× trick-play speeds.

This method of look up table based switching may be explained as follows. A system with N streams provides the ability to switch to and from any stream, and comprises a normal play stream and various trick-play streams. Hence for each stream there are N-1 tables of (byte-offset, byte-offset) pairs required. The first offset in the pair corresponds to the point or location being viewed in the current stream. The second offset refers to the same point in time (program location) in the stream to be switched to.

This mutliple table method may be further explained as sets of nested addresses. For example, with reference to the table for transitions from normal play speed to seven times speed there are seven "from" byte addresses for each "to" byte address. Thus, for each of these seven NP GOPs there is only one GOP to go to in the 7 times speed stream. Similarly for transitions from normal play speed to twenty one times speed there will be 21 NP GOPs which are directed to a single GOP in the twenty one times stream. However, for a transition from twenty one times speed to normal play speed there is a single NP GOP which corresponds to the current 21 times GOP. Hence for transitions from slower to faster play speeds the jump-to addresses may be considered as sets of nested addresses. However, transitions from faster to slower speeds results in single corresponding jump-to addresses.

Table 3 illustrates the general layout of this look up table method. The from/to table entries may be assembled by a software routine which is applied to the pairs of program streams. For example, to assemble the table for transitions from normal play speed to seven times speed the two program streams are partially decoded or parsed to locate GOP headers. The headers for each stream are the assembled into a table, which as described will have seven NP addresses for each 7 times speed address.

In Table 3, the location in the current file or video stream being switched from is indicated by ["from" byte offset N]

which is the offset in bytes. The location in the new file, or video stream where decoding is to start is indicated by ["to" byte offset N], which is the offset in bytes. The [num_pairs] is the number of pairs of switching coordinates in the file. The number of pairs of coordinates in each table depends only on the required precision or granularity when switching between streams, i.e. fewer pairs save storage space but provide fewer locations at which to join the new stream. However, the upper limit for accuracy is still governed by the number of GOPs and hence, the number of possible entry points in the stream being switched to.

TABLE 3

["from" byte offset 1] ["to" byte offset 1]
["from" byte offset 2] ["to" byte offset 2]
["from" byte offset 3] ["to" byte offset 3]
.
.   Repeated [num_pairs] times
.
["from" byte offset <num_pairs–1>] ["to" byte offset <num_pairs–1>]
["from" byte offset <num_pairs>] ["to" byte offset <num_pairs>]

Hence, for a system employing N video streams, each stream will utilize (N–1) tables. These tables are used as follows,
   for switching from stream S1 to S2 (table T_1_2),
   from stream S1 to S3 (T_1_3),
   from stream S1 to S4 (T_1_4) . . .
   and S1 to SN (T_1_N).

For example, if a current image location is at offset O1 in stream S1 and switching to stream S3 is required, the following operation is required:
   1) Find the closest (in time) "from" offset in table S_1_3.
   2) Read the corresponding "to" offset from the same table.
   3) Start decoding stream S3 from the "to" offset value read.

The storage overhead resulting from these tables is still relatively minor when compared with the storage space required by the video streams. The storage overhead for these tables may be calculated based on the following assumptions;
   encoded two hour movie (7200 second)
   Trick-play streams of +7×, –7×, +21×, –21×,
   GOP length of 0.5 seconds,
   bit rate of 4 Mbps, (thus movie=3.6 Gbytes)

There are;
   4×LUT of 14,400 entries (NP stream addresses)
   8×LUT of 14,400/7 entries (7× TP addresses)
   8×LUT of 14,400/21 entries (21× TP addresses)
   Total=79,543 entries, and assuming 8 bytes/entry, Overhead=636,344 bytes $$\text{Overhead \%} = (636,344 / 3.6 \text{ Gbytes} * 100)$$

$$= 0.018\% \text{ of original normal play stream size.}$$

In addition, all control and fine tuning of the switching procedure (accuracy, timing, etc.) can be controlled by an overlay software which alters of modifies the values and number of entries read from the tables themselves without requiring access to the control software.

A system employing the various inventive digital video source selection methods is depicted in FIG. 4. The system shown in FIG. 4 includes a user with, for example, a remote control capability provided by device 525, and a display device 1000 for monitoring audio and video input signals. An interface unit 500, provides a control communication stream 551 between the user's apparatus and a digital video source 10. Interface unit 500 also decodes a compressed digital video signal 511, derived from source 10 to produce audio and video signals which are coupled to display device 1000. The control stream 551 is generated by a control transmitter 550 which forms part of interface unit 500. The control stream carries a plurality of control functions, for example, activation of user billing, user interactively such as program source selection, "trick-play" features or provision of a "virtual VCR" like program source. The user may communicate with interface unit 500, via a remote control unit 525, or via manually activate switches (not shown).

Digital video source 10 comprises a control unit 50 which receives control stream 551 and implements user requested tasks via a software control program. For example, user originated commands may include, per use billing, program selection, pay per view premium program selection, program manipulation or "trick-play" features. User control preferences, as previously described, may be facilitated by user preference control software depicted in block 60 which interacts with the main control software of block 50.

Multiple compressed digital video program sources are stored in a storage device within source 10. The storage device may comprise a solid state memory, magnetic or optical memories or a combination of solid state and magnetic or optical. For exemplary purposes only, the compressed digital video programs depicted in FIG. 4, are shown as areas, or pages of memory with program P1 located on memory page 100, program P2 on page P101 and program Pn on page (99+n). Each program page, comprises a program memory space 110, which contains the compressed program for "reproduction" at normal play speed, for example, block NP for normal play. This normal play program may be represented by the bit rate and resolution parameters shown in table 1, FIG. 1. The program memory space 110, also contains various "trick-play" processed forms of the program, for example, TP1, "trick-play" speed 1 and its reverse, and TP2, "trick-play" speed 2 and its reverse. As described earlier, these "trick-play" versions of the program may be advantageously processed to reduce, or minimize, their memory requirements. For example, as described previously, the provision of four "trick-play" speeds represents and additional memory requirement of about 15%. To permit switching between program play speeds, each program page also contains inventive look up tables 120, which list from-to entry addresses as previously described.

Figure 5:
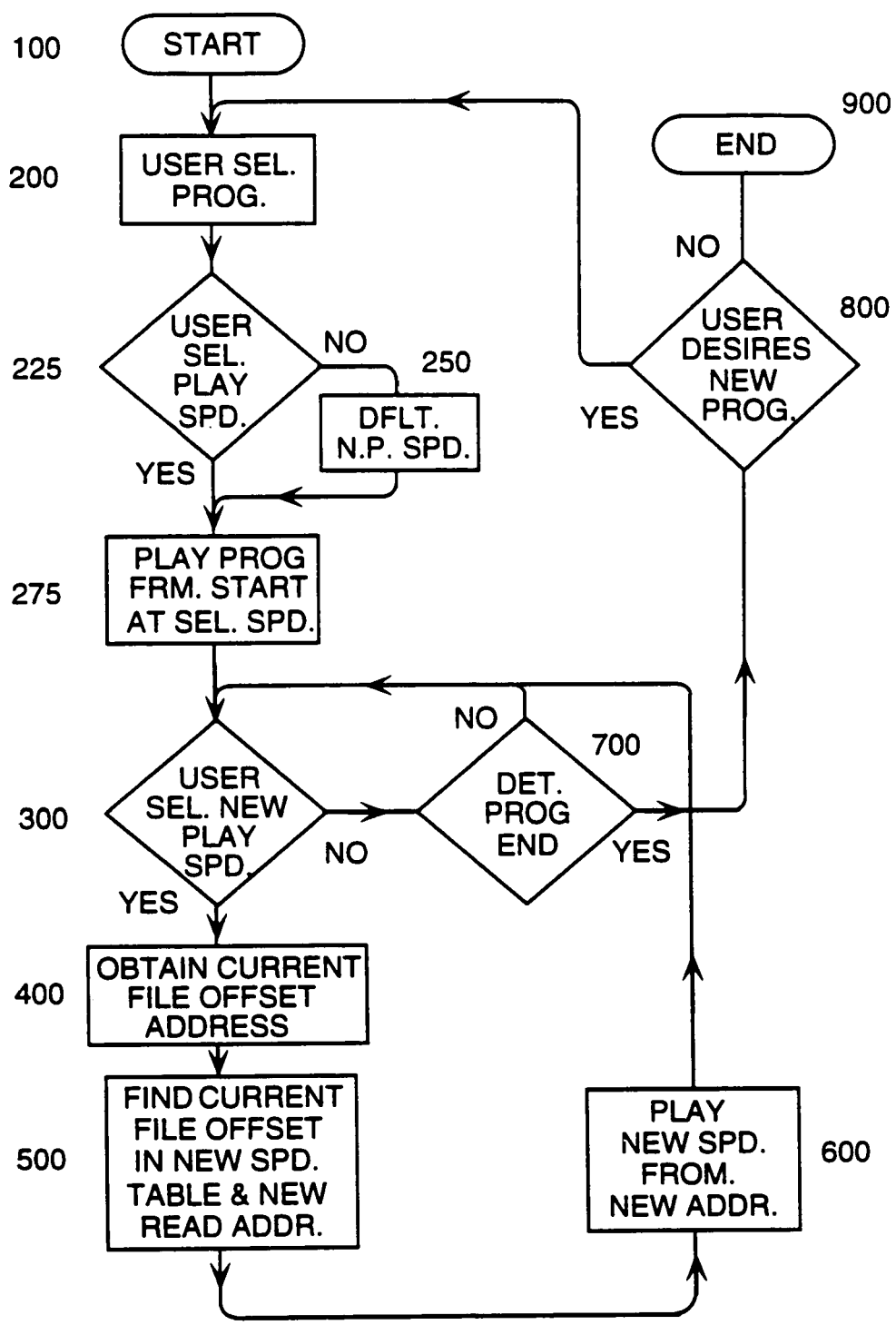
FIG. 5 is a flow chart illustrating operation of an inventive method of selection and control of compressed image streams for reproduction at normal and trick-play speeds.

Operation of the exemplary system shown in FIG. 4 may be explained with reference to the chart shown in FIG. 5. The user initiates contact with the digital video program source 10 by means of the remote control stream 551. This initial contact, or log-on may signal the start a billing period or event, or otherwise log user interaction with the system and is depicted in FIG. 5 as step 100, START. At log on the user may be presented with a program selection menu from which his program selection is made. Control 50 of FIG. 4 receives the user command and selects, for example, Program 1 on memory page 100. This program selection is depicted at step 200 of FIG. 5. Having selected a program, information regarding the program is read from the storage medium and stored in the system memory of source 10. This information may include system data, for example, number of trick-play speeds, look-up tables, and various user choices, for example, display aspect ratio, language, rating etc. A test is performed at step 225 to determine if the user selected a play speed. If the user selected a normal play speed or NP mode, step 225 tests YES and the compressed digital program stream is read from the NP memory area of memory 110, as depicted by step 275 of FIG. 5. Similarly, the user may have selected to view Program 1 in the reverse direction at the highest play speed, thus step 225 tests YES and a version of Program 1 is read from, for example, −TP2 memory area of memory 110. If the user failed to specify play speed, a default setting at step 250 is invoked which automatically selects normal play speed reproduction of the selected Program 1, at step 275 of FIG. 5.

Having commenced reproduction of Program 1 a test is performed at step 300 to determine if a new play speed has been selected by the user. A NO at step 300 is tested further to detect the program end at step 700. Thus a NO at both steps 300 and 700 forms a loop which waits for either a play speed change command or the program end. If test 300 is YES a new play speed has been selected and the control system 50 of FIG. 4 determines the byte offset address in the current program replay. This byte offset determination is depicted as step 400 of FIG. 5. Having received the user's new speed requirement, control system 50 selects from memory area 120, a look-up table specific to the desired speed transition. This look-up table contains pairs of corresponding from/to, or jump-to addresses. At step 500 the table is searched to locate the current byte offset address, which represents the "from address" of the pair. The "to address" gives the corresponding byte location in the new speed stream, from which reproduction will continue. The initiation of the new speed replay from the new address is depicted at step 600 of FIG. 5. The jump-to address is derived as previously described to ensure that the new program version may be decoded independently of adjacent or preceding frames thus maintaining program continuity for the user.

User selected preferences for jump-to location and or jump-to address granularity may be provided during the initial selection of the program at step 206. For example, the look-up tables are recovered from the storage device together other user selectable features such as, language, rating, aspect ratio, etc. The look-up tables may be recomputed or modified prior to actual use by preferences 60. Such modified jump-to addresses may advantageously result in the joining the new program at a point which precedes the departure point of the old, or previously program.

Following initiation of the new speed program replay at step 600, the control sequence loops back to steps 300 and 700 and waits for either a further replay speed request or the end of the program. If at step 700 tests YES, signifying the program end is reached, a further test is performed at step 800 which determines if the user desires to view a new program. A YES at step 800 is coupled back to step 200 where the user may select another program from the program selection menu. A NO at step 800 indicates that the replay session is ended and interaction with source 10 is terminated at the END step 900.

In FIG. 4, an exemplary switch S1 is depicted in memory page 100, for the purpose of illustration only, in actuality the program stream is read from the appropriate play speed memory, i.e. NP, TP2 etc., starting at an address defined by the appropriate address pair from the specific look up table of memory 120, associated with transitions from the current speed to the new speed. Similarly the user may transition from any current play stream to any other play stream by means of tables 120 which list all possible entry points for each play speed.

Source 10 of FIG. 4 may be implemented as a consumer entertainment unit containing multiple programs. For example, a video juke box with an a program disk library and changer mechanism. Source 10 may comprise a combination of disk based programs coupled to an electronic buffer memory. The program disk may be MPEG encoded and in addition contain applicants' advantageous look up tables. These look up tables may contain I frame track addresses which enable the disk replay transducer to jump successively between I frames in order to generate the desired "trick-play" reproduction speed. The storage requirements of these look up tables is small, as has been discussed. However these tables must be recovered from the disk and be stored in an active memory prior to program replay in order to facilitate "trick-play" reproduction. During "trick-play" reproduction the disk replay transducer jumps successively between I frames in a sequence derived from the jump-to tables. For example, at seven times forward speed the transducer is directed to jump "over" seven intervening I frames and reproduce only the eighth I frame. This play jump play sequence is repeated continuously until the program end is reached or the user makes a further selection. Gaps in the reproduced signal stream may be concealed by the use of a buffer memory and image repeat rationales. The program disk may contain "trick-play" specific MPEG streams, temporally and spatially processed to facilitate smoother visual presentation than obtainable with I frame only reproduction. Similarly these "trick-play" specific streams may be the addressable by applicants' advantageous look up tables.

Source 10 may represent portable entertainment unit preloaded with a selection of compressed video programs or motion pictures for consumer use within a household. This entertainment unit may be scaled up and centrally located to provide multiple user access to the compressed program content. This centralized replay facility requires bi-directional communication with the user in order to facilitate a virtual VCR with "trick-play" features described.

What is claimed is:

1. An apparatus for reproducing video programs, comprising:
   means for storing a plurality of video program records, wherein each program record having a set of digitally encoded signal records representative of said each program;
   means for linking said encoded signal records of each said set to one another at predetermined jump points for selecting reproduction from different ones of said set; and,
   wherein each said set of digitally encoded signal records has records of differing sizes for reproduction at a plurality of speeds.

2. The apparatus of claim 1, wherein said predetermined jump points are grouped specific to transitions between similar temporal program events for reproduction at differing speeds.

3. The apparatus of claim 1, wherein said predetermined jump points represent addresses of digital images within each said set which substantially correspond with one another.

4. An apparatus for reproducing video programs, comprising:

means for storing a plurality of video program records, each program record having a set of digitally encoded signal records;

means for linking each of said encoded signal records in each of said sets to one another at predetermined jump points for selecting between said digitally encoded signal records, wherein said linking means comprises N sets of tables, each set having (N−1) tables of said predetermined jump points for each of N reproduction speeds; and, each said set of digitally encoded signal records having records of differing sizes for reproduction at a plurality of speeds.

5. The apparatus of claim 1, wherein a record for reproduction at a normal play speed represents a largest byte record.

6. The apparatus of claim 1, wherein records for reproduction at speeds other than a normal play speed represent records smaller than said normal play speed record and have sizes which decrease in proportion to reproduction speed increase.

7. An apparatus for reproduction of compressed digital images at a plurality of speeds, said apparatus comprising:

a storage device having stored therein compressed program records, each program record containing multiple versions where each version of said multiple versions allows reproduction at a different play speed, and tables of predetermined temporally similar addresses within each version of said each program record for selection between the different play speed records;

transducing means for reproducing images from said compressed program records; and, control means responsive to user program selection for selecting one of said program records, and in accordance with a play speed selection selecting one of said multiple versions, said control means being additionally responsive to user determined new play speed for reading said tables and generating predetermined addresses within another one of said multiple versions for transducing in correspondence with said user determined new play speed.

8. The apparatus of claim 7, wherein said images are reproduced from a time which precedes the preceding version.

* * * * *